July 21 1925.
D. HUMPHREY
APPARATUS FOR DISPENSING BEVERAGES
Filed Aug. 19, 1922
1,546,733
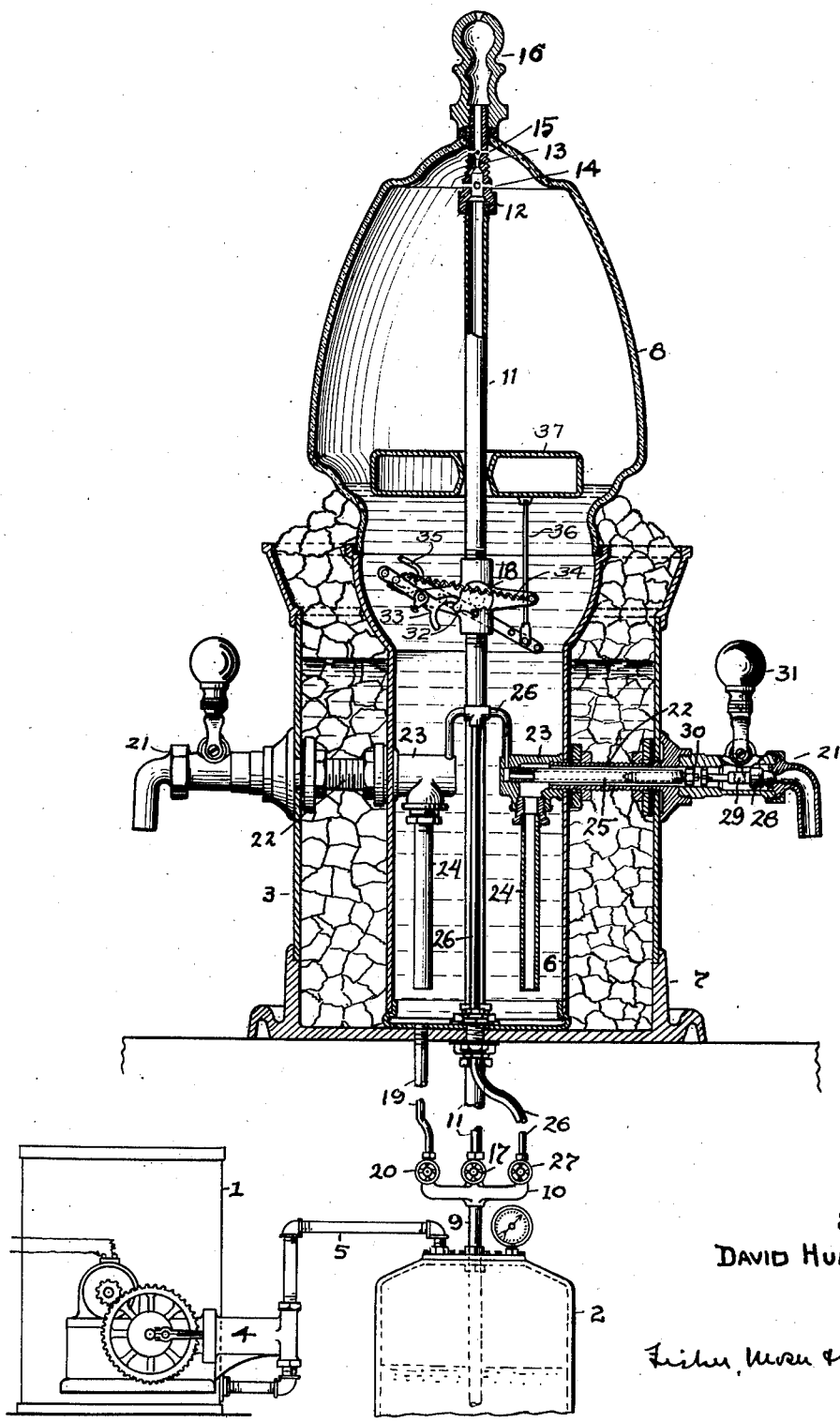
Inventor
DAVID HUMPHREY Patented July 21, 1925.

1,546,733

UNITED STATES PATENT OFFICE.

DAVID HUMPHREY, OF CLEVELAND, OHIO.

APPARATUS FOR DISPENSING BEVERAGES.

Application filed August 19, 1922. Serial No. 583,011.

*To all whom it may concern:*

Be it known that I, DAVID HUMPHREY, a citizen of the United States, residing at Cleveland, in the county of Cuyahoga and State of Ohio, have invented certain new and useful Improvements in Apparatus for Dispensing Beverages, of which the following is a specification.

This invention relates to a method and apparatus for dispensing beverages; the object thereof being to dispense a live and effervescent beverage in the form of a clear liquid without excessive foam.

The following description in connection with the annexed drawing sets forth in detail the improved method and one form of apparatus by means of which the improved method can be carried out.

The accompanying drawings show the beverage cooling dispensing receptacle in vertical section and the liquid supply and carbonating apparatus in side elevation, the latter part of the apparatus being shown on a smaller scale.

Referring to the drawing, the apparatus consists of a liquid supply tank 1, and a carbonic-acid gas tank 2 which receives a syrup mixture from the supply tank 1. Connected with the tank 1, is a motor-driven pump 4 which delivers syrupy liquid through the conduit 5 to the top of the carbonating tank 2. The motor driving the pump 4 is preferably controlled automatically to maintain a predetermined amount of liquid in the tank 2. The apparatus includes an inner base receptacle 6 set within an ice receptacle 7, and a glass dome 8 rests upon the top of the base portion 6. A delivery conduit 9 extends through the top of the carbonating tank 2 to adjacent the bottom thereof and is connected above the top of the tank to a manifold 10. A main liquid supply conduit 11 extends from the manifold 10 through the bottom of the fountain and is connected at its upper end to a discharge fitting 12 having a restricted passage or opening 13 intermediate other lateral openings 14 and 15 in communication with the interior of the container 8, and a perforated cap 16 is connected to the upper end of fitting 12 outside the dome 8. A regulating valve 17 is provided in the conduit 11 immediately above the manifold 10, and this conduit 11 also has an automatic float valve 18 in the container 6 whereby the liquid in the container may be maintained at a constant level. Numeral 18 indicates a rotatable valve member having an operating finger 32 adapted to be engaged by the forked end of a tilting lever 33 which is controlled by a spring 34. A second forked lever 35 is adapted to tilt lever 33 until spring 34 is carried beyond a horizontal dead center line, whereupon the spring acts to rotate the valve quickly by contact of the forked end of lever 33 with finger 32. A link 36 connects one end of lever 35 with a float 37 which is sleeved upon and guides by pipe 11.

Connected with the manifold 10 and in communication with the container 6 through the bottom wall thereof is an auxiliary conduit 19 controlled by a valve 20 adjacent the manifold 10. Gas under pressure is maintained in the carbonating tank 2 above the liquid therein whereby the liquid is maintained in highly charged condition and whereby the charged liquid is forced through the conduits 11 or 19 into the container 3 when the valve 17 or 20 is opened. When the liquid in the receptacle 3 stands for a considerable period the gas escapes therefrom and the liquid becomes flat and unpalatable. By opening the valve 20 highly charged liquid can be injected into the bottom of the container 6 to charge the liquid therein without creating excessive frothing or foaming of the liquid therein.

The fountain is provided with one or more faucets 21 for dispensing the beverage. Any number of faucets may be provided, the drawing showing two disposed on opposite sides thereof. The faucet 21 is disclosed and claimed in my co-pending application Serial No. 583,012, filed August 19, 1922. The faucet 21 forms a continuation of a conduit 22 extending through the wall of the ice receptacle 7 and into the interior of the container 6 through the wall of the base portion 6 thereof. The inner end of the conduit 22 is connected to one branch of an elbow fitting 23 while the other branch of said fitting is connected with a conduit 24 extending to adjacent the bottom of the container. An inner pipe 25 concentrically disposed within the conduit 22 is secured to the rear wall of the fitting 23. A second auxiliary conduit 26 extends from the manifold 10 through the bottom of the container 6 and communicates with the pipe 25 through a passage formed in the rear wall of the fitting 23. The conduit 26 has a valve 27 therein adjacent the manifold 10. The faucet 21 has a valve 28 therein carried by a stem 29 guided for longitudinal movement in the horizontal portion of the faucet. The forward end of the inner pipe 25 has a valve 30 therein adapted to open upon rearward movement thereof. The stem 29 of the valve 28 is connected to an operating lever 31 pivoted upon the faucet 21. The rear end of the stem 29 is spaced a short distance from the forward end of the valve 30 when the valve 28 is in closed position. Upon rearward movement of the stem 29 the rear end thereof engages the valve 30 and gradually opens the same permitting the highly charged liquid from the tank 2 to flow into the stream of liquid passing through the faucet 21. In drawing a drink the operator pulls slowly forward on the lever 31, permitting the clear liquid to flow until the glass is partially filled then opening the valve 28 wider thereby opening the valve 30 to inject highly charged liquid into the stream flowing through the nozzle. By this means the amount of foam or froth upon the liquid served can be easily controlled while at the same time the beverage is thoroughly charged with gas. In this connection it should be understood that in carbonating a mixture of syrup and water within carbonating tank 2 that the resultant product flowing through conduit 11 and pipe 26 is a frothy product. In operations this frothy product is jetted out of lateral ports 14 into contact with the inside of glass container 8, and a small amount may pass upwardly through restricted passage 13 where it is free to escape through lateral ports 15. Unless restricted the product might be discharged through perforated cap 16, but as constructed the device jets the frothy product against the glass container where it flows downward in a frothy state, and gathers within the base 6 where it may be dispensed in the form of a more solid liquid. A certain percentage of gas escapes during the liquefying proceeding and during intervals when the gathered liquid is not frequently dispensed and replenished; but this loss of gas is compensated for and the dispensed product made effervescent and lively by the supplemental charge of frothy product and carbonic gas discharged through pipes 26 and 25 into dispensing faucet 21 at the time of withdrawal of the more solid liquid through outlet conduit 22. Excessive froth can be avoided in dispensing operations by withdrawing the clearer liquid in substantial amount in the first instance and then adding the more highly charged product into the same glass or receiving vessel by opening inner valve 20. Where sales or withdrawals are infrequent and the liquid within the base receptacle becomes flat it may be charged with a fresh supply of carbonated liquid through pipe 19, and when the carbonated liquid within base container 6 is highly charged it may be withdrawn through faucet 21 by merely opening valve 28 and not valve 30, or the latter valve may be opened slightly when the receiving vessel is nearly filled. In this way the operator may dispense either a clear or frothy product from the same faucet to meet different tastes and demands of his customers.

What I claim, is:

1. Apparatus for carbonating and dispensing beverages, comprising a carbonating tank containing a supply of highly carbonated liquid, a beverage cooling dispensing container, means for injecting the highly charged liquid from said carbonating tank into the upper portion of said container; and independently controlled means for injecting said highly charged liquid into the lower portion of said container.

2. Apparatus for carbonating and dispensing beverages, comprising a carbonating tank containing a supply of highly carbonated liquid, a beverage cooling dispensing container; a main conduit leading from said carbonating container into said dispensing container, said main conduit discharging into said container adjacent the top thereof; an auxiliary conduit for conducting the highly charged liquid from said carbonating tank into said container adjacent the bottom thereof; and separate valves controlling the flow through said conduits.

3. Apparatus for carbonating and dispensing beverages, comprising a carbonating tank containing a supply of highly carbonated liquid, a beverage cooling dispensing container; a discharge faucet for said container; a valve in said faucet for controlling the flow of liquid from said container; and means controlled by said valve for injecting highly charged liquid from said carbonating tank into liquid flowing through said faucet.

4. Apparatus for carbonating and dispensing beverages, comprising a tank containing a supply of highly carbonated liquid, a beverage cooling dispensing container; a discharge faucet for said container; a valve in said faucet; means for operating said valve to control the flow of liquid from said container; and means controlled by said valve and operable subsequently to the initial opening movement thereof for injecting a stream of highly carbonated liquid from said carbonating tank into the liquid flowing through said faucet.

5. Apparatus for carbonating and dispensing beverages comprising a carbonating tank; means for maintaining a supply of highly carbonated liquid in said tank;

a beverage cooling dispensing container; means discharging liquid from said tank into the upper portion of said container to fill the same; a discharge faucet communicating with said container adjacent the bottom thereof; a manually operated valve for controlling said faucet; and means controlled by said valve for injecting highly carbonated liquid from said tank into the liquid flowing through said faucet.

In testimony whereof I affix my signature.

DAVID HUMPHREY.